(12) United States Patent
Marquis-Martin (10) Patent No.: US 8,177,086 B2
(45) Date of Patent: May 15, 2012

(54) ELECTRICAL BOX AND STAND AND METHOD FOR USING SAME

(75) Inventor: Guillaume Hugo Marquis-Martin, Lasalle (CA)

(73) Assignee: Ipex Technologies Inc., Mississauga, Ontario (CA)

( * ) Notice: Subject to any disclaimer, the term of this patent is extended or adjusted under 35 U.S.C. 154(b) by 439 days.

(21) Appl. No.: 12/458,869

(22) Filed: Jul. 24, 2009

(65) Prior Publication Data

US 2011/0017730 A1 Jan. 27, 2011

(51) Int. Cl.
*H02G 3/12* (2006.01)
*H02G 3/18* (2006.01)

(52) U.S. Cl. ......... 220/3.4; 220/3.9; 220/4.02; 220/634; 220/629

(58) Field of Classification Search ............ 220/3.2, 220/3.4, 3.9, 3.5, 4.02, 634, 629; 248/158, 248/415; 174/53, 58, 48
See application file for complete search history.

(56) References Cited

U.S. PATENT DOCUMENTS

| | | |
|---|---|---|
| 378,042 A | 2/1888 | Dow |
| 384,440 A | 6/1888 | Greim |
| 879,370 A | 2/1908 | Dennison |
| 1,521,764 A | 1/1925 | Graver |
| 3,218,943 A | 11/1965 | Bowman |
| 4,053,082 A | 10/1977 | Ullman |
| 4,057,164 A | 11/1977 | Maier |
| 4,139,725 A | 2/1979 | Guritz |
| 4,247,738 A | 1/1981 | Bonato |
| 6,102,229 A * | 8/2000 | Moncourtois ............... 220/3.3 |
| 6,316,722 B1 | 11/2001 | Low et al. |
| D492,716 S | 7/2004 | Micheel |
| D497,832 S | 11/2004 | Glover |
| 7,038,130 B2 | 5/2006 | Yip, Jr. |
| 7,193,151 B2 | 3/2007 | Harwood |
| D548,048 S | 8/2007 | Sherrard |
| 7,381,891 B2 | 6/2008 | Hull |
| 7,385,137 B2 | 6/2008 | Burke et al. |
| D575,188 S | 8/2008 | Bycraft |
| 7,442,873 B2 | 10/2008 | McCormick et al. |
| 7,442,883 B2 * | 10/2008 | Jolly et al. .................... 174/483 |
| 7,449,633 B2 * | 11/2008 | Lalancette et al. ............. 174/58 |
| D583,757 S | 12/2008 | Sodemann et al. |
| 7,513,837 B2 * | 4/2009 | Umezawa et al. ............ 473/373 |
| 7,614,143 B2 | 11/2009 | Seff et al. |
| 7,795,544 B2 * | 9/2010 | Peck ............................. 174/482 |
| 7,825,335 B2 * | 11/2010 | Carbone et al. ................. 174/50 |
| 8,022,315 B2 * | 9/2011 | Jolly ............................. 174/482 |
| 2003/0235467 A1 | 12/2003 | Gamson |
| 2007/0081857 A1 | 4/2007 | Yoon |
| 2008/0087462 A1 * | 4/2008 | Jolly et al. ..................... 174/483 |

* cited by examiner

*Primary Examiner* — Mickey Yu
*Assistant Examiner* — Niki Eloshway (57) ABSTRACT

A stand for an electrical box is provided to maintain an electrical box having at least one hub a predetermined distance from a concrete form prior to and during the concrete being poured. The stand has extensions with ribs thereon at different longitudinal positions from the base permitting the electrical box to be supported by the stand at different heights with respect to the concrete form to permit access to the hubs of the electrical box with electrical tubing and to accommodate concrete slabs of different thicknesses using the same height of electrical box. The electrical box and stand assembly have a locking mechanism to lock the electrical box to the stand at the selected predetermined distance from the form. The locking mechanism has hooks which engage indentations on mounting tabs of the electrical box. The mounting tabs have grooves which guide the hooks to the indentations. The stand can be attached to the cement form during building construction to maintain the electrical box at the predetermined distance above the cement form.

28 Claims, 7 Drawing Sheets

ELECTRICAL BOX AND STAND AND METHOD FOR USING SAME

FIELD OF THE INVENTION

This invention relates to stands for maintaining electrical boxes at various predetermined distances from the surface of a concrete form and to resist displacement prior to the concrete being poured and while the concrete is being poured.

BACKGROUND OF THE INVENTION

In the past, there have been many different types of electrical boxes installed in concrete or cement (concrete and cement shall be used interchangeably herein). In general, the electrical boxes together with the electrical non-metallic tubing (ENT) connected thereto are oriented in the concrete form, together with the other elements, and concrete is poured onto the form embedding them therein.

In the past, electrical boxes have been supported in their final position on the form by tying to reinforcing bars (also referred to as rebars) prior to pouring the concrete form. However, instead of, or in addition to, steel rebars, post-tensioned cables or tendons have been used inside poured concrete to provide structural integrity to the concrete slab. Post-tensioned concrete slabs involve a series of cables or tendons which are tightened after pouring of the concrete. Compared to standard rebar reinforced concrete, post tensioned tendons or cables further increase the overall strength of the structure, which leads to a thinner concrete slab, reduced number of vertical support beams as well as quicker construction times. However, with fewer steel rebars in the concrete, as well as thinner concrete slabs, there are fewer elements within the form to which the electrical boxes can be tied in their final position.

Accordingly, one difficulty with the prior art process and system of tying electrical boxes to rebars is that additional time is required to perform this tying action, increasing the cost of installation. Furthermore, it is necessary to find rebar that is at the proper height and location and not being used for another purpose in order to tie the electrical box thereto. Furthermore, with post-tensioned concrete slabs, there are fewer rebars which can be used for tying the electrical box thereto.

Furthermore, with buildings having more glass exterior walls, there are fewer places to install an electrical receptacle in the wall. Therefore, building contractors and civil engineers have been installing the electrical receptacles in the floor. However, there are several difficulties with using floor boxes. For instance, if a typical concrete slab is 8" thick with a further 2" of flooring when installed, a typical floor box of only 6" will be too short to fit within the typical concrete slab. Furthermore, most floor boxes currently offered in the marketplace have a flat bottom which typically rests on the surface area of the form which leaves an exposed area after the concrete has hardened and the form has been removed. This is undesirable because the exposed area must be patched requiring additional labour and increasing the construction times.

Furthermore, the electrical boxes have hubs that are used to receive the electrical tubing and conduit. These hubs may be generally located at the bottom of the electrical box. Because of this, if the box is resting on the concrete form, the electrical tubing must bend down to the hub of the electrical box. This can be difficult if obstacles, such as rebar and/or post-tension cables or tendons, are located close to an electrical box requiring the electrical tubing to be routed around such obstacles. Also, creating a bend in electrical tubing increases the difficulty to pull cable through the tubing after the concrete has been cured and could result in the electrical tubing being permanently and irrevocably damaged.

Accordingly, there is a need in the art for a system and device to maintain an electrical box at a final position on a form without tying the electrical boxes to elements, such as reinforcing bars contained within the concrete form. Furthermore, there is a need in the art to maintain the hubs of the electrical boxes at different distances from the concrete form in order to avoid excessive bending of the electrical tubing down to the hub and/or around other obstacles and elements also contained in the concrete form to reach the hub. There is also a need in the art for a robust system and method to accommodate concrete slab and floor thicknesses which may vary depending on construction methods used, such as whether or not post-tensioned slabs are used.

SUMMARY OF THE INVENTION

Accordingly, it is an object of this invention to at least partially overcome some of the disadvantages of the prior art. Also, it is an object of at least some aspects of this invention to provide an improved electrical box stand and method which does not require the electrical boxes to be tied to any elements contained on the concrete form. Furthermore, it is an object of at least some aspects of this invention to provide an electrical stand and method which can maintain the hubs of the electrical box at different predetermined distances above the concrete form so as to decrease the bending of electrical tubing down to the hubs.

Accordingly, in one of its aspects, this invention resides in an electrical box and stand assembly comprising: an electrical box having hubs for receiving electrical tubing, said electrical box having at least one mounting tab; a stand having a base for supporting the stand and the electrical box on a surface prior to and during pouring concrete into the form, said stand comprising at least one extension, each extension having a plurality of supports for mating with the at least one mounting tab to support the electrical box at different distances from the surface; wherein the at least one mounting tab mates with one of the plurality of supports on the at least one extension to support the hubs of the box at a predetermined distance from the surface.

In a further aspect, this invention resides in a stand for maintaining an electrical box having hubs at a predetermined distance from a surface of a concrete form prior to concrete being poured, said stand comprising: a base for supporting the stand and the electrical box on the surface of the form; at least one extension extending from the base, each of the at least one extensions having a plurality of ribs defining slots there between for supporting the hubs of the box at different distances from the form; wherein the slots defined by the plurality of ribs receive mounting tabs on the electrical box; and wherein, on each extension, a corresponding one of the slots at a predetermined distance from the base receives one of the mounting tabs of the electrical box, such that the hubs of the box are supported by the ribs at the predetermined distance from the surface of the form.

In a still further aspect, this invention resides in a method of maintaining an electrical box having hubs at a predetermined distance from a surface prior to and during concrete being poured, said method comprising: providing an electrical box having hubs for receiving electrical tubing, said electrical box having at least one mounting tab; providing a stand having a base for supporting the stand and the electrical box on the surface, said stand comprising at least one extension having a plurality of supports for mating with the at least one mounting tab to support the hubs of the electrical box at different distances from the surface; selecting one of the plurality of supports on each of the extensions having a distance from the base which will support the hubs of the electrical box at the predetermined distance from the surface; and mating the mounting tabs of the electrical box with the selected ones of the plurality of supports on the extensions to support the hubs of the electrical box the predetermined distance from the surface.

Accordingly, an advantage of one of the aspects of the present invention resides in having the electrical box secured to the stand with the hubs elevated above the concrete form a predetermined distance. This predetermined distance is preferably selected to permit the electrical tubing to be received within the electrical box with a minimum of bending. For instance, this predetermined distance is generally selected to permit the electrical tubing to avoid being routed around other obstacles in the concrete form, such as the steel rebar and/or post-tension cables. This predetermined distance is also selected to accommodate the thickness of the concrete slab and the expected flooring. Because the thickness of the slabs and the positioning of other elements in the form vary, one advantage of an aspect of this invention is to permit the same box to be maintained at any one of a plurality of different predetermined distances using the same standard box assembly thereby requiring only one type of electrical box providing a more robust system and method. This also decreases manufacturing costs because a single type of box and stand assembly need be developed and can be used with a variety of different construction environments and varied thicknesses of concrete slabs.

A further aspect of the present invention is that the stand and electrical box may be locked together at the selected distance above the concrete form. This may decrease displacement of the electrical box in the construction environment prior to the concrete being poured, such as by workmen jostling the electrical box or electrical tubing, and also while pouring of the concrete. In a preferred embodiment, the stand can be secured to the concrete form by means of screws, nails or other fastening devices and/or adhesives, now known or developed in the future, to ensure that the stand is attached to the concrete form when the electrical box has been locked in place to the stand.

An advantage of a further aspect of the present invention is that the stand has a relatively small volume, but can raise the opening of the floor box to a certain height above the concrete form to accommodate concrete slabs and flooring of differing thicknesses with a single box having a standard height, and without greatly increasing the volume of the floor box. In this aspect of the invention, the volume of the stand is preferably less than 200 cubic centimeters ($cm^3$), more preferably less than 100 $cm^3$ and still more preferably about 90 $cm^3$. In this way, the smaller volume of the stand decreases the structural effect of the standard electrical box on the concrete slab, but ensures the opening of the box will be accessible from the surface once the flooring has been installed. Furthermore, this decreases the overall material and manufacturing costs of the electrical stand and box assembly.

An advantage of another aspect of the present invention relates to the stand having a small footprint such that a small surface area is in contact with the concrete form. In this way, when the concrete form is removed, little to no repair is required.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1:
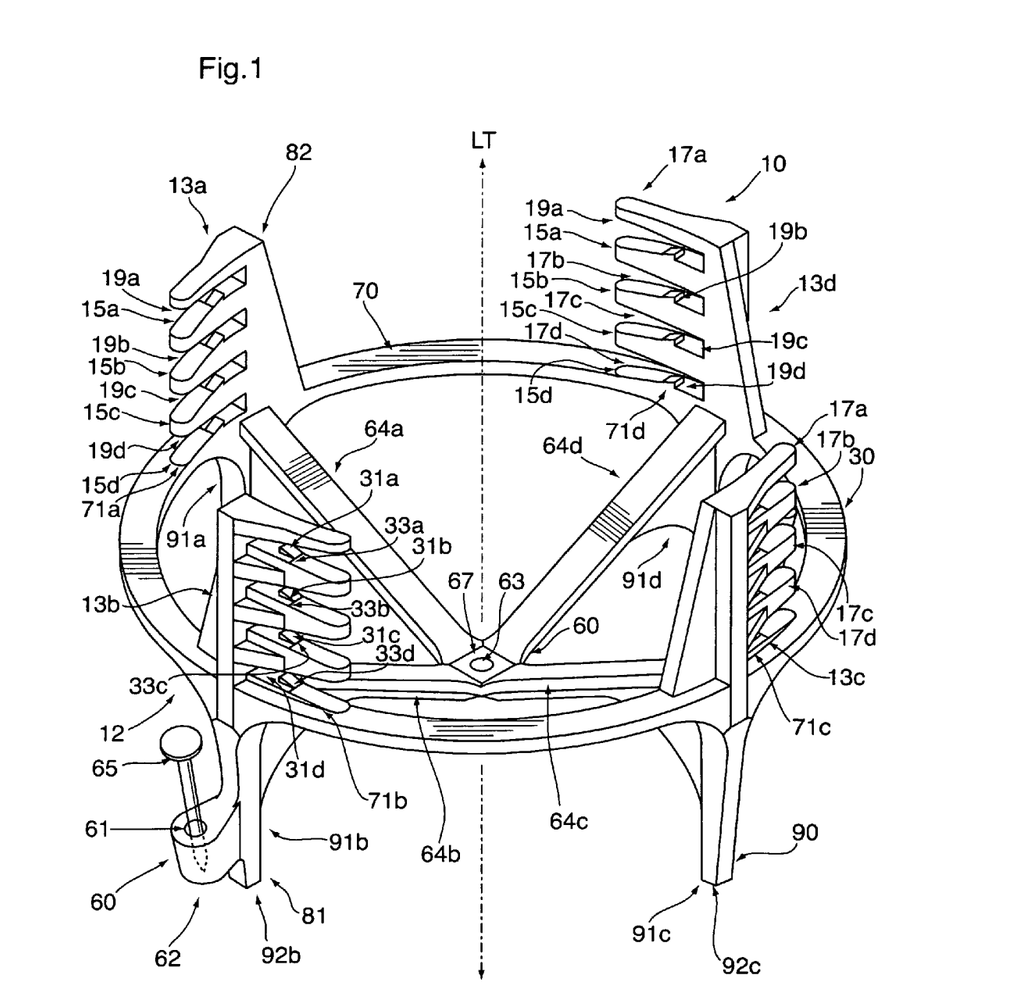
FIG. 1 is a perspective view of the stand according to one embodiment of the present invention.
Figure 2:
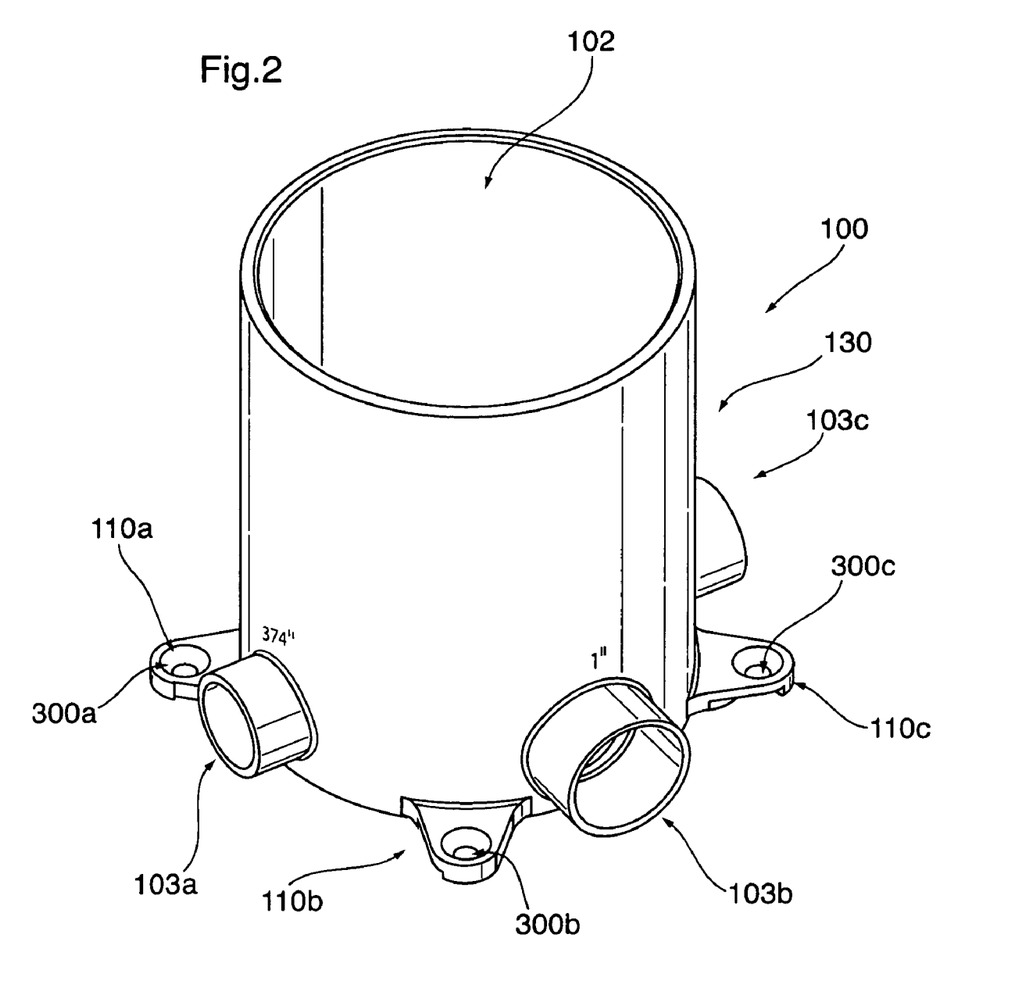
FIG. 2 is a perspective view of the electrical box according to one embodiment of the present invention.
Figure 3:
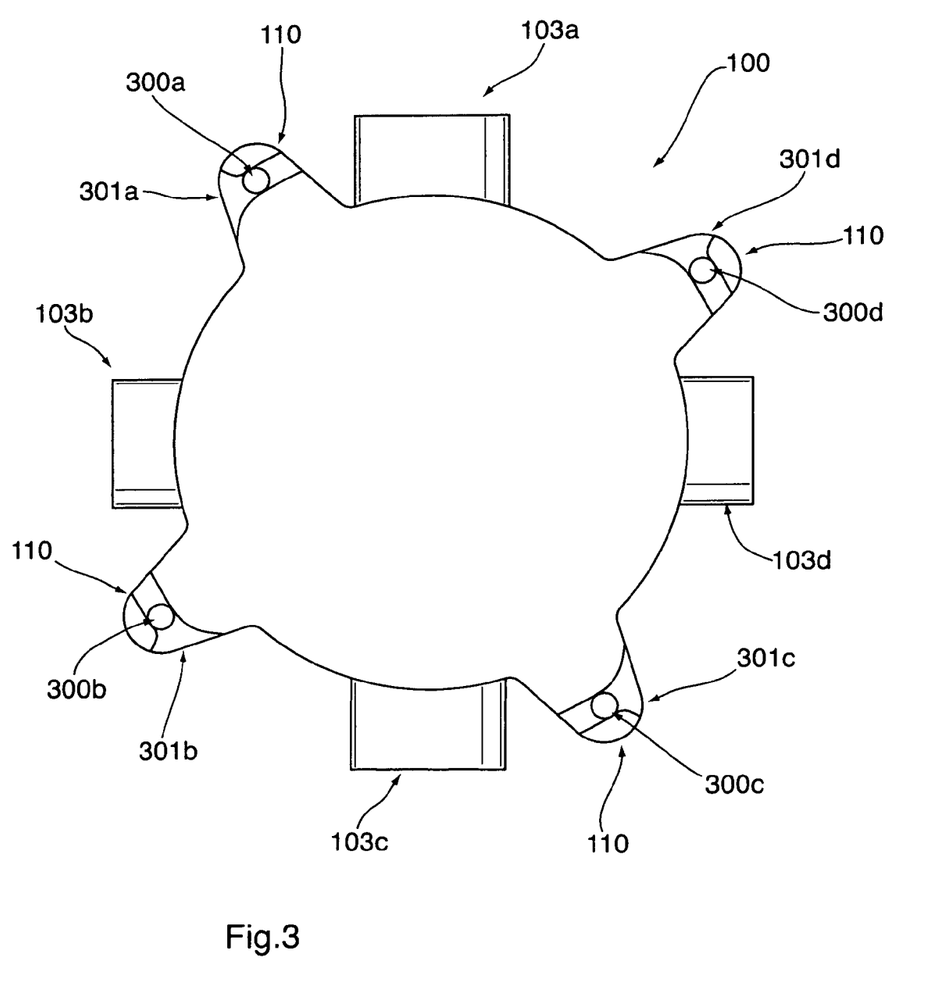
FIG. 3 is a bottom view of the electrical box according to one embodiment of the present invention.
Figure 4:
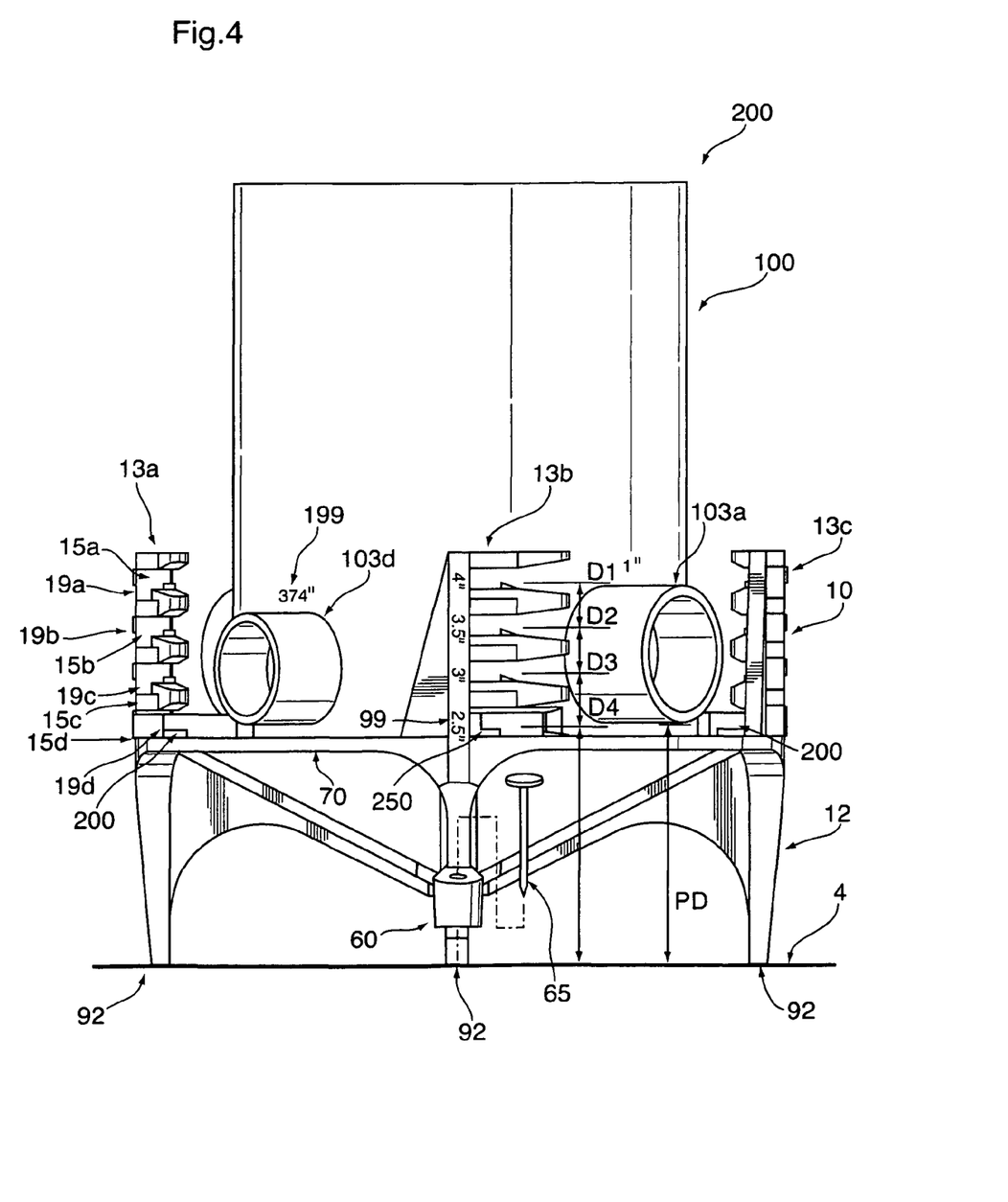
FIG. 4 is a side elevational view of the assembly of the electrical box with the stand shown.
Figure 5:
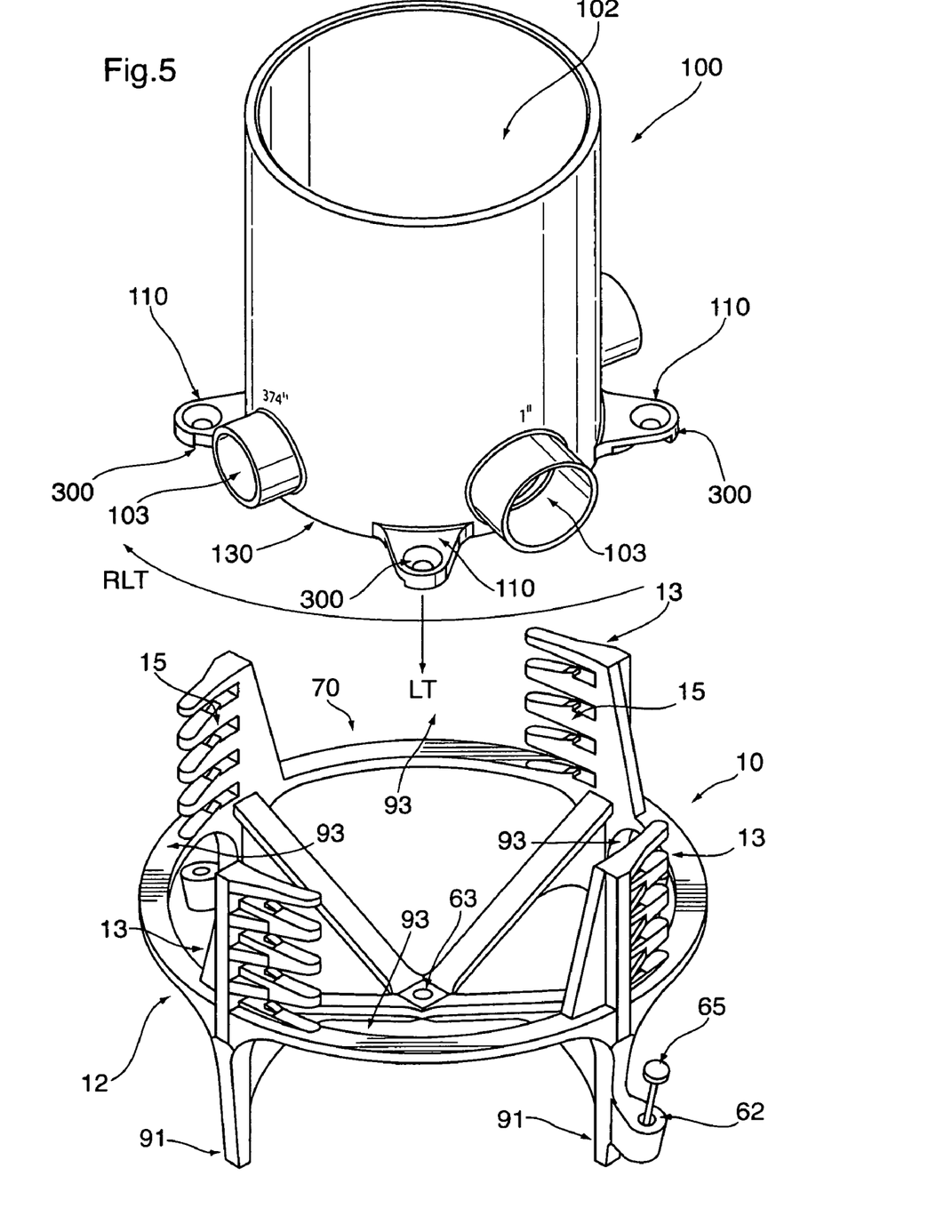
FIG. 5 illustrates the assembly of the floor box with the stand according to one embodiment of the present invention.
Figure 6:
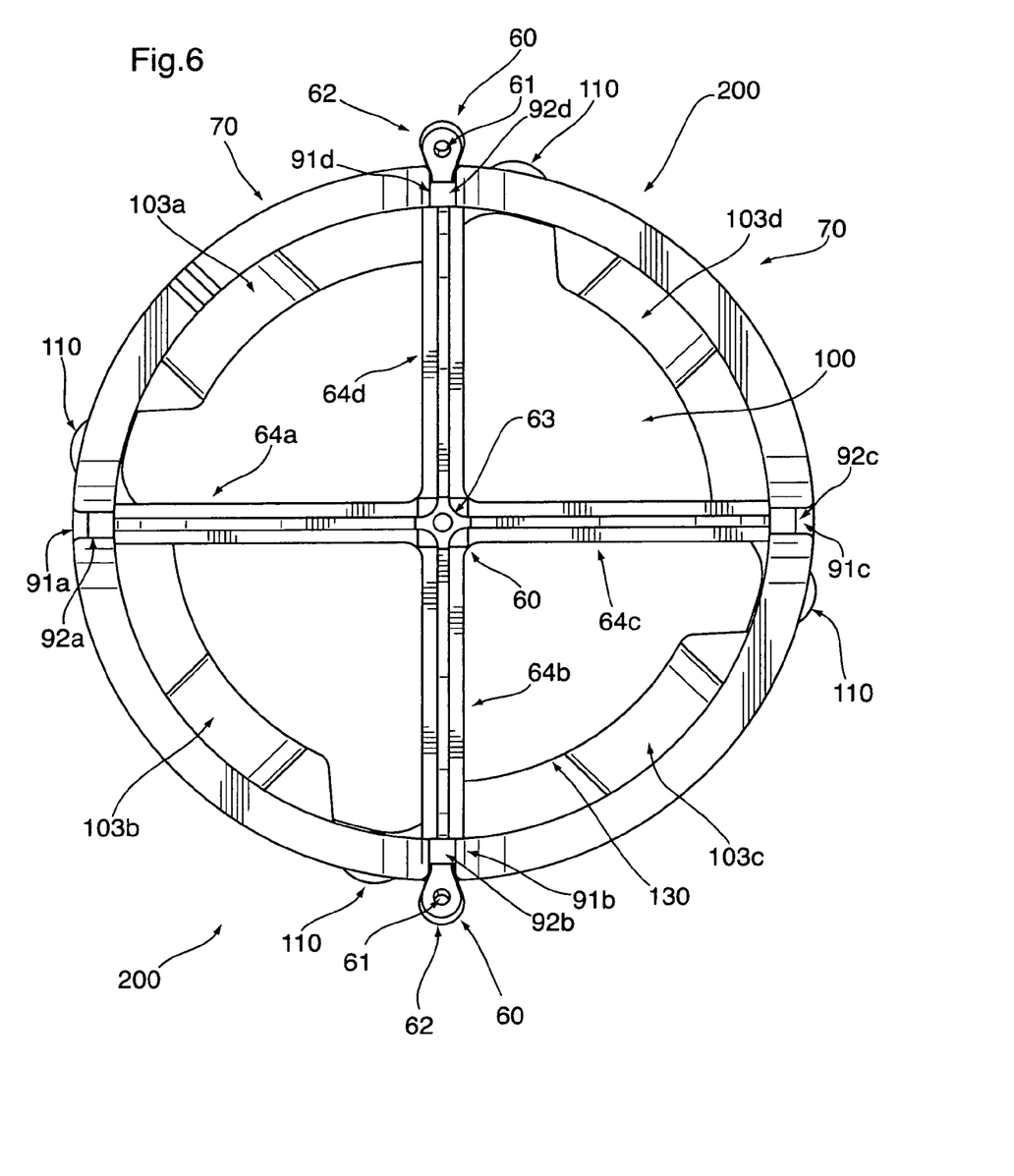
FIG. 6 illustrates the bottom plan view of the electrical box and stand assembly.
Figure 7:
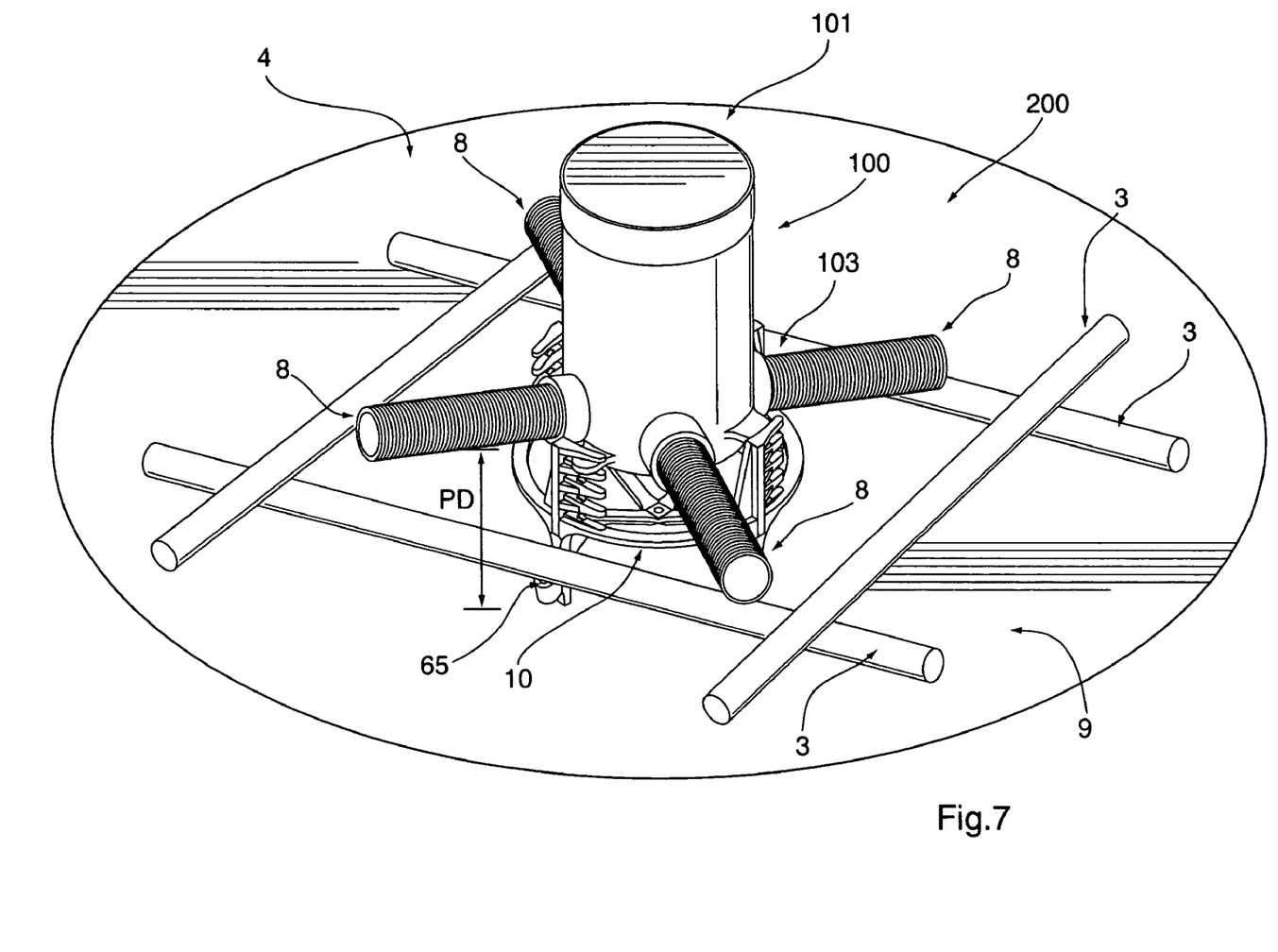
FIG. 7 illustrates an assembled floor box and stand connected to electrical tubing and affixed to a surface of a concrete form containing rebars or cables in a form prior to the concrete being poured.

As shown in FIGS. 4, 5, 6 and 7, one embodiment of the present invention relates to an electrical box and stand assembly as shown generally by reference numeral 200. FIG. 1 illustrates the stand, as shown generally by reference numeral 10, according to one embodiment of the present invention, which combines with the electrical box, shown generally by reference numeral 100 in FIGS. 2 and 3, to form the electrical box and stand assembly 200. FIG. 5 illustrates the method of assembling the stand 10 with the electrical box 100 to form the assembly 200. FIG. 7 illustrates the assembly 200 assembled in the field with electrical tubing 8 extending from the hubs 103 of the electrical box 100 according to one embodiment of the present invention.

As illustrated in FIGS. 1 and 4, the stand 10 comprises a base, shown generally by reference numeral 12, for supporting the stand 10 and also the electrical box 100 when assembled with the electrical box 10. The base 12 supports the stand and electrical box assembly 200 on a surface, shown generally by reference numeral 4 in FIGS. 4 and 7. It is understood that the surface 4 may be any type of surface upon which concrete (not shown) may be poured. In a preferred embodiment, and the general case, the surface 4 will be the surface of a concrete form, as shown generally by reference numeral 9 in FIG. 7. As also illustrated in FIG. 7, the concrete form 9 will also have thereon reinforcing bars 3 to reinforce the concrete (not shown) which will eventually be poured into the concrete form 9. The rebar 3 could also be replaced by cables, tendons or other types of tensioning or reinforcing mechanisms now known or which may be developed in the future.

As illustrated in FIG. 7, the stand 10 supports the hubs 103 of the box 100 a predetermined distance PD on the surface 4. The predetermined distance PD may be selected in a number of ways. However, as illustrated in FIG. 7 in this embodiment, the predetermined distance PD is selected to minimize the bending of the electrical tubing 8 received within the electrical hubs 103 of the electrical box 100. This is done, for instance, by elevating the electrical box 100 above the surface 4, such that the hubs 103 are above or below the rebar 3. In this way, the tubing 8 is permitted to unobstructively enter by the hubs 103. In other words, the stand 10 supports the box 100 at the predetermined distance PD from the surface 4 to minimize bending of the tubing 8 received within the hubs 103. The predetermined distance PD may also be selected to permit the electrical box to fit within the resulting concrete slab and flooring (not shown) after the concrete is poured. The electrical box 10 may eventually be used to house electrical devices (not shown). The hubs 103 may receive tubing 8 of different diameter, and, to facilitate this, the hubs 103 may have indicia 199 showing the size of tubing 8 it may receive.

Furthermore, as illustrated in FIG. 7, the stand 10 which supports the electrical box 100 has a much smaller contact surface area 92 than the bottom of the electrical box such that the surface area of the electrical box and stand assembly 200 on the surface 4 is much less than would be the case if the box 100 rested directly on the surface 4.

As also illustrated in FIG. 7, the concrete box 100 in this preferred embodiment has a cap 101 which prevents concrete from being poured accidentally into the opening 102 of the electrical box 100. The cap 101 can later be removed after the concrete has been poured and cured.

As illustrated best in FIG. 1, the stand 10 extends along a longitudinal axis, shown generally by reference numeral LT with the base 12 at a first end 81 and at least one and preferably three or more extensions, as shown generally by reference numeral 13, at the second end 82 opposed to the first end 81. In a preferred embodiment, the extensions 13 extend in a direction parallel to a longitudinal axis LT and there are four extensions 13a, 13b, 13c, 13d.

Each extension 13a, 13b, 13c, 13d, preferably has a plurality of supports, as shown generally by reference numeral 15. For ease of reference, the plurality of supports 15a, 15b, 15c, 15d are illustrated only on extension 13a. However, it is understood that each of the extensions 13a, 13b, 13c and 13d comprise a separate plurality of supports 15. The plurality of supports on each of the extensions mate with at least one mounting tab 110 on the electrical box 100 to support the electrical box 100 at different distances D1, D2, D3 and D4 from the surface 4, as illustrated in FIG. 4. The electrical box 100 may have 2, 3, 4 or more mounting tabs 110 to mate with the supports 15 on the extensions 13. In a preferred embodiment, the electrical box 100 will have an equal number of mounting tabs 110 to extensions 13, such that each of the mounting tabs 110 will mate with one of the plurality of supports 15 on each of the extensions 13.

When the at least one mounting tab 110 mates with one of the plurality of supports 15 on the at least one extension 13, the electrical box 100 and the stand 10 are assembled to form the assembly 200 and support the hubs 103 of the electrical box 100 at the selected predetermined distance PD from the surface 4. It is understood that the predetermined distance PD will change with various situations depending on the position of the rebar 3 and also the thickness of the concrete slab and flooring. Therefore, the plurality of supports 15 are located at the different distances D1, D2, D3, D4 from the surface 4 to permit the electrical box 100 to be supported at a number of different distances from the surface 4, such that at least one of the different distances D1, D2, D3, D4 will correspond to the preferred predetermined distance PD for the particular installation. Accordingly, one of the plurality of supports 15a, b, c, d on each extension 13a, b, c, d is selected to support the box 10 at the predetermined distance PD above the surface 4. To assist in selecting the one of the plurality of supports 15 to support the hubs 103 at the predetermined distance PD, the stand 10 preferably comprises indicia, shown generally by reference numeral 99 in FIG. 4, identifying the different distances D of the supports 15 from the first end 81 of the stand 10 and also the surface 4 when the stand 10 supports the electrical box and stand assembly 200 from the surface 4.

In a further preferred embodiment, to ensure that each of the mounting tabs 110 remain mated to the selected one of the supports 15 on each of the extensions 13 to support the hubs 103 at the predetermined distance PD from the surface 4, the box and stand assembly 200 preferably comprises a locking mechanism, shown generally by reference numeral 250 in FIG. 4 on one of the extensions for ease of illustration. The locking mechanism 250 locks each of the mounting tabs 110 to the selected one of the plurality of support 15 on each of the extensions 13 when the hubs of the box 100 are supported at the predetermined distance PD from the surface 4 to resist displacement of the electrical box 100 from the stand 10 prior to and enduring pouring of the concrete. It is appreciated that prior to pouring of the concrete, the construction site may have a number of workers and tradespeople walking on the surface 4 and possibly jostling the elements on the concrete form 9 including the rebar, the electrical tubing 8 and also the electrical boxes 100. The locking mechanism 250 resists the displacement of the electrical box from the stand 10 prior to the concrete being poured. As will also be appreciated, concrete tends to be a rather dense and viscous substance such that it is difficult to pour and must occasionally be spread manually, such as with shovels. The locking mechanism 250 preferably locks each mounting tab 110 to the selected one of the plurality of supports of each extension 13 to resist displacement during pouring of the concrete and to maintain hubs 103 at the predetermined distance PD.

In a further preferred embodiment, the locking mechanism 250 comprises a hooking mechanism, as shown generally by reference numeral 31a, b, c and d, associated with each of the supports 15. For ease of reference, the hooking mechanism 31a, b, c and d is shown only on the extension 13b in FIG. 1, but it is appreciated that similar hooking mechanisms 31 are present in association with each of the supports 15. The hooking mechanism 31 may comprise a hook, as shown generally by reference numeral 33a, b, c and d, in FIG. 1. The hooking mechanism 31 preferably engages corresponding indentations, as shown generally by reference numeral 300a, b, c and d in FIG. 3 associated with each mounting tab 110. The indentations 300 may be simple depressions or dimples on the mounting tabs 110. Otherwise, the indentations 300 may comprise holes through the mounting tabs 110. It is understood that the indentations 110 will include all forms of indentations, depressions and dimples, including holes through the mounting tabs 110. The hooking mechanism 31 on each of the supports 15 engage the indentation 300 on the mounting tabs 110 to lock the mounting tabs 110 to the selected one of the plurality of supports 15 on each of the extensions 13 when the mounting tab 110 is supported by the selected one of the plurality of supports 15.

In a further preferred embodiment, the locking mechanism 250 comprises grooves, as shown generally by reference numerals 301a, b, c and d in FIG. 3 associated with each of the mounting tabs 110. The grooves 301 assist in guiding the hooking mechanism 31 into engagement with the corresponding indentations 300. This facilitates simpler and more efficient mating and locking of the mounting tabs 110 to the selected one of the plurality of supports 15 of each of the extensions 13 to support the hubs 103 at the desired predetermined distance PD. This is particularly useful where more than one and preferably three or four extensions 13 are present on the stand 10 to simultaneously mate with corresponding mounting tabs 110 on the electrical box 100.

In a further preferred embodiment, the supports 15 comprise ribs 17. For ease of reference, the ribs 17 are illustrated on the extensions 13c and 13d in FIG. 1. The ribs 17 may define slots 19. For ease of reference, the slots 19a, b, c and d are illustrated only with respect to the extension 13d shown in FIG. 1. However, it is understood that each of the extensions 13 have ribs 17 defining slots 19 in this preferred embodiment.

As illustrated in FIG. 1, each of the ribs 17a, b, c, d extend from the extension 13 a different distance D from the base 12 and each of the ribs 17 carry a hook 33 of the hooking mechanism 31 to hook into the indentation 300 of the mounting tab 110. In this way, the ribs 17a, b, c, d can support the hubs 103 of the electrical box 100 at different distances D1, D2, D3, D4 from the surface 4. In the preferred embodiment, where the extensions 13 extend in the longitudinal direction LT, the ribs 17 are at different distances D from the base 12 and the surface 4 as measured along the longitudinal axis LT.

Preferably, the ribs 17 resiliently bias the hooking mechanism 31 into the grooves 301 of the mounting tabs 110. The grooves 301 then guide the hooking mechanism 31 into a hooking engagement with the indentation 300 of each mounting tab 110 when the mounting tab 110 enters the slot 19. In a preferred embodiment, when the slot 19 receives a mounting tab 110, an adjacent rib 17 resiliently biases the hook 33 of the hooking mechanism 31 into a hooking engagement with indentation 301 of the mounting tab 110. Preferably, at least one adjacent rib 17 will resiliently bias the hook 33 of the hooking mechanism 31 into engagement with the indentation 300 of the mounting tab 110.

FIG. 5 illustrates the method of assembling the stand 10 and electrical box 100. As illustrated in FIG. 5, the electrical box 100 and the stand 10 are moved together along the longitudinal axis LT. Preferably, the stand 10 comprises channels 93 between the extensions 13 to permit passage of the hubs 103 and the mounting tabs 110 along the longitudinal axis LT of the stand 10 and without interfering with the extensions 13. Generally, the hubs 103 and the mounting tabs 110 will be located about the circumference 130 of the electrical box 100. The presence of the channels 93 permits the electrical box 100 to fit between the extensions 13. Preferably, the extensions 13 are located about a circumference 30 of the stand 10 to permit relative longitudinal movement along the longitudinal axis LT of the hubs 103 and mounting tab 110 between the extensions 103. With the tabs 110 and hub 103 located on the circumference 130 of the box 100, the box 100 can fit between the extensions 13 with the hubs 103 and tabs 110 passing within the channels 93 to permit the tabs 110 to engage the supports 15 of the extension 13 at the predetermined distance PD.

When the electrical box 100 is at the appropriate distance from the surface 4, relative rotation of the box 100 and stand 10 along the longitudinal axis LT, as shown by reference numeral RLT, causes the slots 19 to receive the corresponding one of the tabs 110 of the electrical box 100. As shown in FIG. 5, there is an equal number of extensions 100 and mounting tabs 110, such that one support 15 on each of the extensions 13 will mate with one of the mounting tabs 110.

The indicia 99 on the extensions 13 will assist in selecting the support 15 to support the hubs 103 of the box 100 the predetermined distance PD form the surface 4. It is appreciated that the supports 15a, b, c, d on each of the extensions 13a, b, c, d are at the same distance from the surface 4 and the mounting tabs 110 are at the same longitudinal position along the electrical box, such that the mounting tabs 110 will mate with the same selected ones of the supports 15a, b, c, d in all of the extensions 13a, b, c, d, simultaneously and at one of the distances D1, D2, D3, D4 from the surface 4. It is understood that this need not necessarily be the case and different arrangements may be possible with the mounting tabs 110 being in different longitudinal positions along the electrical box 100 and mating with supports 15a, b, c, d of one extension 13 being at different distances from the surface 4 from corresponding supports 15 a, b, c, d on other extensions 13.

The base 12 preferably comprises at least one support, as shown generally by reference numeral 90 having a contact surface area 92 at the first end 81 for contacting the surface 4. In a preferred embodiment, the at least one support 90 comprises at least three, and more preferably four legs 91a, b, c, d located about the base 12 of the stand 10. The legs 91 each terminate at a contact surface area 92a, b, c, d shown best in FIG. 6. The contact surface areas 92a, b, c, d contact the surface 4. Preferably, the contact surface areas 92a, b, c, d are sufficiently small to leave a small footprint onto the concrete form 9 when it is removed in order to avoid the need to repair any exposed surface of the concrete. It is preferred that the contact surface area 92 along with the legs 91 be less than 1 inch$^2$. Similarly, it is preferred that the stand 10 has a very small total volume. Preferably, the total volume of the stand is less than 200 cm$^3$, more preferably, less than 100 cm$^3$ and still more preferably about 90 cm$^3$.

In order to improve support of the electrical box 100, it is preferred that the extensions 13 be longitudinally aligned along the longitudinal axis LT with a corresponding one of the legs 91 to support the stand 10 and the electrical box 110 on the surface 4. This is illustrated, for instance, in FIG. 1 where each of the extensions 13 are longitudinally aligned along the longitudinal axis LT with a corresponding leg 91 in order to more efficiently transfer the weight of the electrical box 100 to the leg contact surface area 92.

Similarly, in a preferred embodiment, the stand 10 comprises at least three and preferably four or more centrally extending supports, as shown generally by reference numerals 64a, b, c, d in FIG. 1, which extend from the longitudinal axis LT to a corresponding one of the legs 91a, b, c, d. This further improves the stability of the stand 10 and ensures that the electrical box and stand assembly 200 is not adversely affected in the construction environment prior to the concrete being poured and also during pouring of the concrete.

In a further preferred embodiment, the stand 10 comprises an attachment mechanism, as shown generally by reference numeral 60, to attach the stand to the concrete form 9. The attachment mechanism 60 may comprise tabs 62 having tab openings 61 for receiving fastening devices 65. For added support, the attachment mechanism 60 preferably comprises a central hole 63 oriented along the longitudinal axis LT at a nexus 67 of the centrally extending support 64a, b, c, d for receiving a further fastening device (not shown). In this way, the stand 10 may be attached to the surface 4 which, in one embodiment, would be the concrete form 9. The fastening device 65 can be any type of fastening device that can pass through the holes 61, 63 including nails, rivets, staples, bolts, screws and other types of fastening devices. However, the attachment mechanism 60 may also comprise other types of attachment mechanisms as known, for instance, glue, double sided tape, epoxy, or the like, in addition to, or in replacement of, the attachment tabs 62 and central hole 63. Small amounts of concrete may also be used. In this way, the attachment mechanism 60 may not include fastening devices 65.

In a further preferred embodiment, and as also illustrated in FIG. 1, the stand 10 comprises a unitary support, as shown generally by reference numeral 70, which connects to the extensions 13 and the legs 91. The unitary support 70 unifies all of the elements of the stand 10 into an integral stand and avoids adverse rotational forces. Furthermore, as illustrated in FIG. 1, the unitary support 70 defines the bottom portion 71a, b, c, d of the lowest-most support 15d on each of the extensions 13a, b, c, d. Each bottom portion 71a, b, c, d of the unitary support 70 also comprises, in one embodiment, a hooking mechanism 31d, as illustrated in FIG. 1. The adjacent rib 17c resiliently biases the mounting tabs 110 downwards and thereby biases the hooking mechanism 31d into the groove 301 to guide the hooking mechanism 31d into hooking engagement with the indentation 300 of the mounting tab 110.

It is appreciated that the stand 10 has been illustrated in a shape having a circular cross-section similar to that of the electrical box. However, it is understood that the stand 10 may have any known shape including square, rectangular or triangular, to name but a few possible shapes, provided the stand has the other features as described and illustrated herein.

It is also understood that while reference has been made to electrical tubing entering the hubs 103, it is understood that the invention is not limited to electrical tubing, but rather any type of element could enter the hubs 103. For example, the hubs 103 could receive electrical pipe, electrical conduit and electrical non-metallic tubing (ENT) to name but a few. Therefore, while reference has been made to electrical tubing, it is understood that this invention is not restricted to electrical tubing, but rather can relate to any type of pipe, conduit or tubing now in existence or may be invented in the future for connecting electrical or fibre optic cables to the hubs of electrical boxes.

It is also understood that while reference has been made to a locking mechanism which is integrally formed with the stand and box, the locking mechanism is not restricted in this regard. Rather, the locking mechanism may include external elements (not shown), such as rivets, staples or tying cable to lock the stand 10 to the electrical box 100.

It is also understood that the attachment mechanism for attaching the stand to the surface of the concrete form has been defined according to one preferred embodiment. However, the attachment mechanism is not restricted to this embodiment. Rather, other attachment mechanisms could also be used, such as rivets, staples, adhesives, epoxy, magnets, to name but a few. In addition, small amounts of concrete could be used to attach the stand to the form prior to pouring the remainder of the concrete onto the form.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. An electrical box and stand assembly comprising:
   an electrical box having hubs for receiving electrical tubing, said electrical box having at least one mounting tab;
   a stand having a base for supporting the stand and the electrical box on a surface prior to and during pouring concrete into the form, said stand comprising at least one extension, each extension having a plurality of supports for mating with the at least one mounting tab to support the electrical box at different distances from the surface;
   a locking mechanism to lock the at least one mounting tab to one of the plurality of supports;
   wherein the at least one mounting tab mates with one of the plurality of supports on the at least one extension to support the hubs of the box at a predetermined distance from the surface, and, the locking mechanism locks the at least one mounting tab to the one of the plurality of supports when the hubs of the box are supported at the predetermined distance from the surface to resist displacement of the electrical box prior to and during pouring of the concrete.

2. The electrical box and stand assembly as defined in claim 1 wherein the locking mechanism comprises:
   an indentation associated with each mounting tab; and
   a hooking mechanism associated with each support, said hooking mechanism engaging the indentation of the mounting tab when the mounting tab is supported by the corresponding support.

3. The electrical box and stand assembly as defined in claim 2 wherein the locking mechanism comprises grooves associated with the mounting tabs for guiding the hooking mechanism into engagement with the indentations.

4. The electrical box and stand assembly as defined in claim 3 wherein the stand comprises two or more extensions and the plurality of supports on each extension comprises a plurality of ribs, each rib extending from the extension at a different distance from the base, and wherein each of the plurality of ribs carry the hooking mechanism.

5. The electrical box and stand assembly as defined in claim 4 wherein the plurality of ribs are resilient and define slots there between;
   wherein the mounting tabs enter the slots by resiliently separating at least one adjacent rib; and
   wherein the at least one adjacent rib resiliently biases the hooking mechanism into the grooves to guide the hooking mechanism into hooking engagement with the indentation of the mounting tab when the mounting tab enters the slot.

6. The electrical box and stand assembly as defined in claim 5 wherein the stand extends along a longitudinal axis with the base at one end and the extensions at the second end opposed to the first end, said extensions extending parallel to the longitudinal axis; and
   wherein the electrical box fits within the stand along the longitudinal axis and relative rotation of the stand and the box about the longitudinal axis causes the at least one mounting tabs of the box to enter a corresponding one of the slots defined by the plurality of ribs on said extensions.

7. The electrical box and stand assembly as defined in claim 6 wherein said extensions are located about a circumference of the stand to permit relative longitudinal movement of the hubs and mounting tabs of the box between the two or more extensions.

8. The electrical box and stand assembly as defined in claim 1 wherein the predetermined distance is selected to permit electrical tubing to unobtrusively enter the hubs.

9. The electrical box and stand assembly as defined in claim 1 wherein the base comprises an attaching mechanism for attaching the stand to the surface.

10. The electrical box and stand assembly as defined in claim 1 wherein the stand extends along a longitudinal axis with the base at a first end and the extensions at a second end opposed to the first end, said extensions extending parallel to the longitudinal axis.

11. A stand for maintaining an electrical box having hubs at a predetermined distance from a surface of a concrete form prior to concrete being poured, said stand comprising:
- a base for supporting the stand and the electrical box on the surface of the form;
- at least one extension extending from the base, each of the at least one extensions having a plurality of ribs defining slots there between for supporting the hubs of the box at different distances from the form;
- wherein the slots defined by the plurality of ribs receive mounting tabs on the electrical box;
- wherein, on each extension, a corresponding one of the slots at a predetermined distance from the base receives one of the mounting tabs of the electrical box, such that the hubs of the box are supported by the ribs at the predetermined distance from the surface of the form; and
- wherein each of the plurality of ribs carry a hooking mechanism which are operable to engage an indentation associated with each of the mounting tabs when the slot receives the mounting tab to lock the mounting tab to one of the plurality of ribs when the hubs of the box are supported at the predetermined distance from the surface.

12. The stand as defined in claim 11 wherein the hooking mechanism engages grooves associated with the mounting tabs for guiding the hooking mechanism into engagement with the indentations; and
- wherein, when the slot receives the mounting tab, an adjacent rib resiliently biases the hook of the hooking mechanism into the grooves to guide the hooking mechanism into hooking engagement with the indentation of the mounting tab.

13. The stand as defined in claim 11 wherein the base comprises an attaching mechanism for attaching the stand to the surface.

14. The stand as defined in claim 11 wherein the stand extends along a longitudinal axis with the base at one end and the extensions at a second end opposed from the first end, said extensions extending parallel to the longitudinal axis;
- wherein the slots are at different distances from the base measured along the longitudinal axis; and
- wherein the base comprises at least one support terminating at a contact surface area at the first end for contacting the surface.

15. The stand as defined in claim 14 wherein the electrical box fits within the stand along the longitudinal axis and relative rotation of the box and the stand along the longitudinal axis causes the slot to receive the corresponding one of the mounting tabs of the box.

16. The stand as defined in claim 14 wherein the contact surface area comprises three or more leg contact surface areas and the at least one support comprises at least three legs, each leg terminating at one of the at least three leg contact surface areas.

17. The stand as defined in claim 16 wherein the stand comprises at least three extensions and each of the at least three legs is longitudinally aligned a corresponding one of the extensions to support the stand and electrical box on the surface.

18. The stand as defined in claim 17 further comprising:
- at least three centrally extending supports extending from the longitudinal axis to a corresponding one of the at least three legs.

19. The stand as defined in claim 18 further comprising an attachment mechanism for attaching the stand to the surface form, said attachment mechanism comprising:
- a tab associated with at least one of the legs for receiving a first fastening device; and
- a central opening along the longitudinal axis at a nexus of the centrally extending supports, said central opening receiving a second fastening device.

20. The stand as defined in claim 18 further comprising:
- channels extending between the extensions for passage of the hubs and mounting tabs of the electrical box along the longitudinal axis of the stand; and
- wherein the mounting tabs and hubs are located on a circumference of the electrical box, and, the at least three extensions of the stand are oriented to permit the electrical box to fit there between with the hubs and mounting tabs passing within the channels to engage the mounting tabs extending from the circumference of the electrical box.

21. The stand as defined in claim 16 further comprising:
- a unitary support connected to at least one extension and the at least three legs; and
- wherein the unitary support defines the bottom portion of one of the slots; and
- wherein the unitary support carries the hooking mechanism.

22. The stand as defined in claim 11 wherein a total volume of the stand is less than 100 cubic centimeters.

23. A method of maintaining an electrical box having hubs at a predetermined distance from a surface prior to and during concrete being poured, said method comprising:
- providing an electrical box having hubs for receiving electrical tubing, said electrical box having at least one mounting tab;
- providing a stand having a base for supporting the stand and the electrical box on the surface, said stand comprising at least one extension having a plurality of supports for mating with the at least one mounting tab to support the hubs of the electrical box at different distances from the surface;
- selecting one of the plurality of supports on each of the extensions having a distance from the base which will support the hubs of the electrical box at the predetermined distance from the surface;
- mating the mounting tabs of the electrical box with the selected ones of the plurality of supports on the extensions to support the hubs of the electrical box the predetermined distance from the surface; and
- locking the mounting tabs of the electrical box with a locking mechanism to lock the at least one mounting tab to the selected one of the plurality of supports when the hubs of the box are supported at the predetermined distance from the surface to resist displacement of the electrical box prior to and during pouring of the concrete.

24. The method as defined in claim 23, wherein the selected support is selected to minimize bending of the electrical tubing received in the electrical hubs.

25. The method as defined in claim 23, wherein the selected support is selected to permit the electrical box to fit within the resulting concrete slab and flooring after the concrete is poured.

26. The method as defined in claim 23 wherein the locking mechanism comprises:

an indentation associated with each mounting tab; and
a hooking mechanism associated with each support, said hooking mechanism engaging the indentation of the mounting tab when the mounting tab is supported by the corresponding support.

27. The method as defined in claim 26 wherein the locking mechanism comprises grooves associated with the mounting tabs for guiding the hooking mechanism into engagement with the indentations.

28. The method as defined in claim 23 further comprising: attaching the standing to the surface with an attachment mechanism prior to pouring of the concrete.

* * * * *